United States Patent [19]
Watanabe et al.

[11] Patent Number: 5,932,625
[45] Date of Patent: Aug. 3, 1999

[54] PHOTO-CURABLE RESIN COMPOSITION AND PROCESS FOR PREPARING RESIN-BASEDMOLD

[75] Inventors: Tsuyoshi Watanabe, Ibaraki; Ayao Matsumura, Mie; Yuichi Haruta; Takashi Ukachi, both of Ibaraki, all of Japan

[73] Assignees: DSM N.V., Herleen, Netherlands; JSR Corporation; Japan Fine Coatings Co., Ltd., both of Tokyo, Japan

[21] Appl. No.: 08/865,676

[22] Filed: May 30, 1997

[51] Int. Cl.$^6$ .................................. C08F 2/46; B27N 3/08
[52] U.S. Cl. .................................. 522/33; 526/72; 526/75; 526/88; 526/89; 526/318.1; 526/318.4; 522/35; 522/43; 522/64; 522/68; 522/82; 522/83; 264/239; 264/257; 264/331.11; 264/331.15
[58] Field of Search .................................. 526/72, 75, 88, 526/89, 318.1, 318.4; 522/33, 35, 43, 64, 68, 82, 83; 524/422; 264/239, 257, 331.11, 331.15

[56] References Cited

U.S. PATENT DOCUMENTS

| | | | |
|---|---|---|---|
| 4,575,330 | 3/1986 | Hull | 425/174.4 |
| 4,942,066 | 7/1990 | Fan | 427/54.1 |
| 5,002,855 | 3/1991 | Fan | 430/270 |
| 5,496,870 | 3/1996 | Chawla et al. | 522/90 |

FOREIGN PATENT DOCUMENTS

| | | |
|---|---|---|
| 60-247515 | 12/1985 | Japan . |
| 62-35966 | 2/1987 | Japan . |
| 62-101408 | 5/1987 | Japan . |
| 5-24119 | 2/1993 | Japan . |
| 7-205157 | 8/1995 | Japan . |

OTHER PUBLICATIONS

Derwent Abstract 008048476, JP 1232025, Sep. 1989.

Derwent Abstract 010200745, JP 7026062, Jan. 1995.

Derwent Abstract 010200743, JP 7026060, Jan. 1995.

*Primary Examiner*—Samuel A. Acquah
*Attorney, Agent, or Firm*—Pillsbury Madison & Sutro

[57] ABSTRACT

A photo-curable resin composition suitable as a material for photo-fabricating and capable of producing cured products with excellent mechanical strength and high heat resistance. Further disclosed is a process for molding a resin-based mold which provides superior molding dimensional precision and superb repetition durability. The resin composition contains a monomer component containing (A) 30–70 wt % of a polyfunctional unsaturated monomer having a cyclic structure and (B) 70–30 wt % of a monofunctional unsaturated monomer having a cyclic structure of which the homopolymer has a glass transition temperature (Tg) of 70° C. or higher; (C) a photo-initiator; and (D) an inorganic filler having an average particle diameter or an average fiber length of 1–50 μm, wherein the ratio of the inorganic filler to 100 parts by volume of the monomer components and the photo-initiator is 100–160 parts by volume, and the heat distortion temperature of the cured resin produced from the photo-curable resin composition is 100° C. or higher.

23 Claims, 1 Drawing Sheet

[ I ]

[ II ]

[ I ]

[ II ]

PHOTO-CURABLE RESIN COMPOSITION AND PROCESS FOR PREPARING RESIN-BASEDMOLD

BACKGROUND OF THE INVENTION

1. Field of the Invention

The present invention relates to a photo-curable resin composition and a process for preparing a mold by photo-fabrication this photo-curable resin composition.

2. Background Information

In recent years, photo-fabricating processes for forming three-dimensional objects consisting of integrally laminated cured resin layers prepared by repeating a step of forming a cured resin layer by selectively irradiating a photo-curable material with light have been proposed (see Japanese Patent Application Laid-open No. 247515/1985, U.S. Pat. No. 4,575,330 (Japanese Patent Application Laid-open No. 35966/1987), Japanese Patent Application Laid-open No. 101408/1987, Japanese Patent Application Laid-open No. 24119/1993). These photo-fabricating processes are attracting attention due to their capability of easily forming the target three-dimensional object in a short period of time even when the shape of the object is complicated.

A typical example of such a photo-fabricating process comprises forming a thin layer of a liquid photo-curable resin composition, selectively irradiating this thin layer with light using, for example, an ultraviolet radiation laser to obtain a cured resin layer, feeding the photo-curable resin composition to form another thin layer of the composition over this cured resin layer, and selectively irradiating this thin layer with light to form a new cured resin layer which is integrally laminated over the previously formed cured resin layer. This step is repeated a number of times, with or without changing the pattern in which the light is irradiated to form a three-dimensional object consisting of integrally laminated multiple cured resin layers.

The characteristics demanded of the photo-curable resin composition used for these photo-fabricating processes include a low viscosity, the capability of being rapidly cured by irradiation of light, non-swelling characteristics of the cured products when contacted by a photo-curable resin composition, and minimal deformation due to shrinkage during curing with light, such as production of warped parts, indented parts with a sink mark, or overhanging parts with curl.

Three-dimensional objects prepared by photo-fabricating methods have conventionally been used for a design model, a model for medical services, and a master model for a resin molding mold. In recent years, attempts have been made to mount parts such as a connector or a plug, and to incorporate parts for test purposes such as a heater, a motor, or an engine, directly manufactured by photo-fabricating methods. In addition to high dimensional accuracy, mechanical strength and heat resistance sufficient to withstand conditions of use are demanded of these parts. However, the conventional photo-fabricating method using a photo-curable resin composition cannot produce cured products with sufficient mechanical strength and heat resistance. It has therefore been difficult to manufacture three-dimensional objects for mounting parts and incorporating parts having good mechanical strength and heat resistance which can withstand actual conditions of use.

On the other hand, there has been an attempt to manufacture a mold used for various molding methods such as the injection molding method, press molding method, vacuum molding method, high-pressure molding method, or foaming molding method by an photo-fabrication method (such a mold made from a resin composition is hereinafter called a resin-based mold).

However, no conventional photo-fabricating method using known photo-curable resin compositions can produce photo-fabricating objects possessing sufficient pressure resistance and heat resistance as demanded of such a resin-based mold. In particular, there has been no resin composition known in the art which can produce an photo-fabricated product, such as an photo-fabricated resin-based mold, which can withstand high temperature, high pressure conditions under which engineering plastics are molded by injection. It is therefore difficult to manufacture a resin-based mold having excellent repetition durability by a photo-fabricating method.

The present invention has been achieved in view of this situation and has an object of providing a photo-curable resin composition which can produce cured products with excellent mechanical strength and heat resistance by a photo-fabricating method. Another object of the present invention is to provide a process for manufacturing a resin-based mold which exhibits high dimensional accuracy and superior repetition durability in the manufacture of molded articles.

SUMMARY OF THE INVENTION

The above first object can be attained in the present invention by a photo-curable resin composition for photo-fabrication comprising, a monomer component which comprises, (A) 30–70 wt % of a polyfunctional unsaturated monomer having a cyclic structure, and (B) 70–30 wt % of a monofunctional unsaturated monomer having a cyclic structure of which the homopolymer has a glass transition temperature (Tg) of 70° C. or higher; (C) a photo-initiator; and (D) an inorganic filler having an average particle diameter or an average fiber length of 1–50 $\mu$m, wherein the ratio of the inorganic filler to 100 parts by volume of said monomer components and the photo-initiator is 100–160 parts by volume, and the heat distortion temperature of the cured resin produced from the photo-curable resin composition is 100° C. or higher. The bending strength of the the cured resin produced from the photo-curable resin composition is preferably greater than about 9 kg/mm$^2$.

The above second object can be attained in the present invention by a process for preparing a resin-based mold formed by a plurality of integrally laminated layers of cured resin by repeating the step of forming a cured resin layer by selective irradiation with light using the above-mentioned photo-curable resin composition.

DETAILED DESCRIPTION OF THE INVENTION

Figure 1:
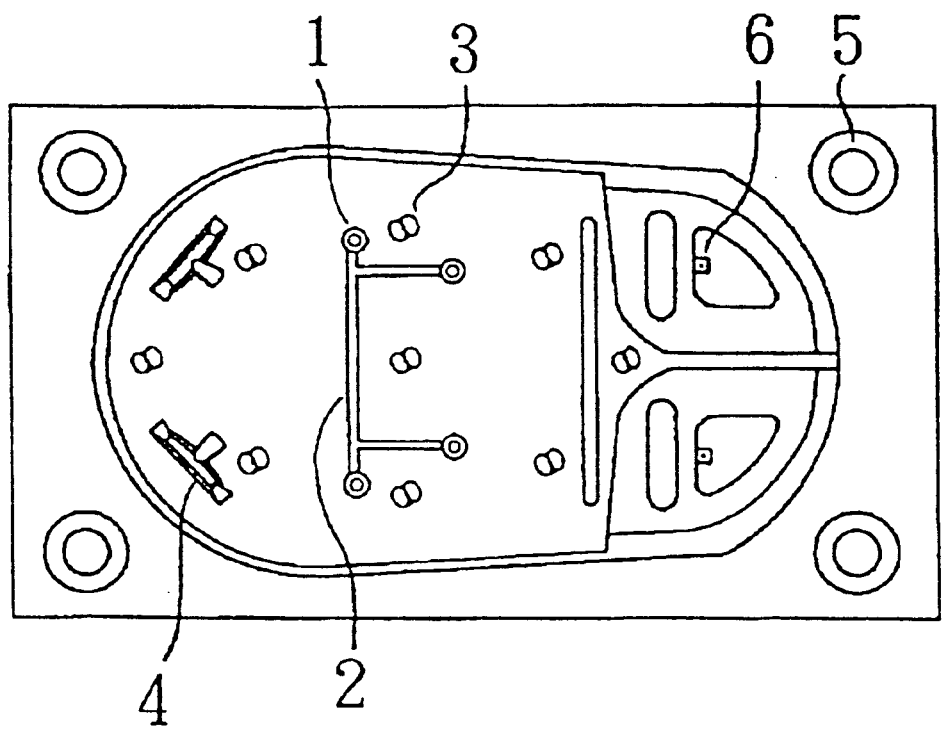
FIG. 1 is a diagram showing the configuration of the resin-based mold prepared in the Example. The symbols in FIG. 1 represent as follows: 1 Pin form, 2 Rib, 3 Pin form, 4 Nail, 5 Securing screw hole, and 6 Pin form.
Figure 1:
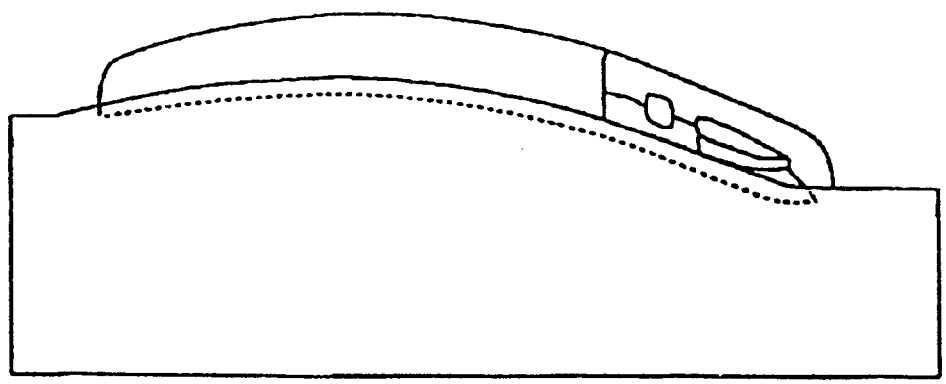

The present invention will now be explained in detail.

The photo-curable resin composition of the present invention comprises a monomer component which contains the component (A) and the component (B), a photo-initiator as the component (C), and an inorganic filler as the component (D).

Monomer Component

The monomer component which constitutes the photo-curable resin composition of the present invention contains a polyfunctional unsaturated monomer having a cyclic structure (hereinafter referred to as specific polyfunctional monomer (a)) as the component (A), and a monofunctional unsaturated monomer having a cyclic structure of which the homopolymer has a glass transition temperature (Tg) of 70° C. or higher (hereinafter referred to as specific monofunctional monomer (b)) as the component (B).

Given as examples of the specific polyfunctional monomer (a) are polyfunctional (meth)acrylates, such as tricyclodecanediyldimethylene di(meth)acrylate, tris(2-hydroxyethyl)isocyanurate di(meth)acrylate, tris(2-hydroxyethyl)isocyanurate tri(meth)acrylate, caprolactone modified tris(2-hydroxyethyl)isocyanurate tri(meth) acrylate, bisphenol A di(meth)acrylate, EO modified bisphenol A di(meth)acrylate, PPO modified bisphenol A di(meth) acrylate, bisphenol F di(meth)acrylate, EO modified bisphenol F di(meth)acrylate, PPO modified bisphenol F di(meth)acrylate, bisphenol S di(meth)acrylate, EO modified bisphenol S di(meth)acrylate, PPO modified bisphenol S di(meth)acrylate, hydrogenated bisphenol A di(meth) acrylate, EO modified hydrogenated bisphenol A di(meth) acrylate, EO modified bromination bisphenol A di(meth) acrylate, PPO modified bromination bisphenol A di(meth) acrylate, PPO modified hydrogenated bisphenol A diacrylate, hydrogenated bisphenol F di(meth)acrylate, EO modified hydrogenated bisphenol F di(meth)acrylate, PPO modified hydrogenated bisphenol F di(meth)acrylate, hydrogenated bisphenol S di(meth)acrylate, EO modified hydrogenated bisphenol S di(meth)acrylate, PPO modified hydrogenated bisphenol S di(meth)acrylate, bisphenol A diglycidyl ether di(meth)acrylate, bisphenol F diglycidyl ether di(meth)acrylate, bisphenol S diglycidyl ether di(meth) acrylate, hydrogenated bisphenol A diglycidyl ether di(meth)acrylate, hydrogenated bisphenol F diglycidyl ether di(meth)acrylate, hydrogenated bisphenol S diglycidyl ether di(meth)acrylate, (meth)acrylate of phenolnovolac polyethylene glycidyl ether, 1,3-di(meth)acrylamide methyl-2-imidazolydone, cardoepoxy (meth)acrylate, trimethylolpropane (meth)acrylic acid benzoate, allylated cyclohexyl di(meth)acrylate, methoxylated cyclohexyl di(meth) acrylate, epichlorohydrin modified phthalic acid di(meth) acrylate, aromatic polyester (meth)acrylate, alicyclic polyester acrylate, and neopentyl glycol-modified trimethylolpropane di(meth)acrylate. These compounds may be used either individually or in combinations of two or more.

Of these, particularly preferred are tricyclodecanediyldimethylene di(meth)acrylate, tris(2-hydroxyethyl) isocyanurate tri(meth)acrylate, bisphenol A diglycidyl ether di(meth)acrylate, and bisphenol F diglycidyl ether di(meth) acrylate.

Examples of the specific polyfunctional monomer (a) which are commercially available include the following products commercially available under the trademarks of SA1002 (manufactured by Mitsubishi Chemical Co., Ltd.), Viscoat 700, 540, 3000, 3700 (manufactured by Osaka Organic Chemical Industry Co., Ltd.), Kayarad R-551, R-712, R-604, R-684, HBA-024E, HBA-240P (manufactured by Nippon Kayaku Co., Ltd.), Aronix M-210, M-215, M-315, M-325, M-6200, M-6400 (manufactured by Toagosei Chemical Industry Co., Ltd.), Light Acrylate BP-4EA, BP-4PA, BP-2EA, BP-2PA, DCP-A (manufactured by Kyoeisha Chemical Industry Co., Ltd.), New Frontier BPE-4, TEICA, BR-42M, GX-8345 (manufactured by Daiichi Kogyo Seiyaku Co., Ltd.), ASF-400 (manufactured by Nippon Steel Chemical Co., Ltd.), Lipoxy SP-1506, SP-1507, SP-1509, VR-77, SP-4010, SP-4060 (manufactured by Showa Highpolymer Co., Ltd.), and NK Ester A-BPE-4 (manufactured by Shin-Nakamura Chemical Industry Co., Ltd.).

The proportion of the component (A) in the monomer component is 30–70 wt %, preferably 35–65 wt %, and particularly preferably 40–60 wt %. If this proportion of the component (A) is less than 30 wt %, the resulting composition does not exhibit sufficient photo-curability and cannot produce cured product with adequate mechanical strength and heat resistance. On the other hand, if the proportion of the component (A) exceeds 70 wt %, the viscosity of the photo-curable resin composition is too high and the curing shrinkage rate of the photo-curable resin composition is significant, so that it is difficult to obtain cured products with high molding dimensional precision.

The specific monofunctional monomer (b) is a monofunctional monomer having a cyclic structure and an ethylenically unsaturated bond. The homopolymer obtained by polymerizing this monomer has a glass transition temperature (Tg) of 70° C. or higher, preferably 90° C. or higher. The use of the monomer of which the homopolymer has a glass transition temperature (Tg) of 70° C. or higher as the component (B) ensures cured products exhibiting sufficient heat resistance required for a heat resistant product (for instance, a molding mold) which is used under high temperature conditions.

Here, the glass transition temperature (Tg) of the homopolymer of the specific monofunctional monomer (b) is a value measured by differential scanning calorimeter (DSC) analysis. Specifically, after the addition of 1-hydroxycyclohexylphenyl ketone to the specific monofunctional monomer (b) in an amount to make the concentration of the 1-hydroxy-cyclohexylphenyl ketone 3 wt %, the mixture was irradiated with ultraviolet light at a dose of 5 J/cm2. The secondary transition temperature of the differential thermal curve obtained by DSC measurement (the rate of temperature rise: 20° C./min) was taken as the glass transition temperature (Tg) of this homopolymer.

Given as examples of the specific monofunctional monomer (b) are (meth)acryloyl morpholine, morpholinoethyl (meth)acrylate, isobornyl (meth)acrylate, N-vinyl caprolactam, N-vinyl pyrrolidone, tricyclo[$5.2.1.0^{2,6}$] decanyl (meth)acrylate, dicyclopentenyl (meth)acrylate, (meth) acrylated hydrogenated naphthol, o-phenylphenol glycidyl ether (meth)acrylate, p-phenylphenol (meth) acrylate, (meth)acrylated cyclohexene oxide, 2-(meth) acryloyloxyethyl hydrogen phthalate, 2-(meth) acryloyloxypropyl hydrogen phthalate, and 2-(meth) acryloyloxypropylhexahydro hydrogen phthalate. These compounds may be used either individually or in combinations of two or more.

Of these, (meth)acryloyl morpholine, isobornyl (meth) acrylate, N-vinyl caprolactam, N-vinyl pyrrolidone, tricyclo [$5.2.1.0^{2,6}$]decanyl (meth)acrylate, and dicyclopentenyl (meth)acrylate are particularly preferred.

The following compounds can be given as examples of the commercially available specific monofunctional monomer (b): ACMO (manufactured by Kojin Co., Ltd.), FA-513A, FA-511A (manufactured by Hitachi Chemical Co., Ltd.), Aronix TO-1316, TO-1225, TO-1317, TO-1315 (manufactured by Toagosei Chemical Industry Co., Ltd.), and IBXA, Viscoat 2000, 2100, 2150 (manufactured by Osaka Organic Chemical Industry Co., Ltd.).

The proportion of the component (B) in the monomer component is 30–70 wt %, preferably 35–65 wt %, and particularly preferably 40–60 wt %. If this proportion of the component (B) is less than 30 wt %, the curing shrinkage rate of the resulting photo-curable resin composition is significant, so that it is difficult to obtain cured products with high molding dimensional precision. On the other hand, if the proportion of the component (B) is more than 70 wt %, the resulting composition does not exhibit sufficient photo-curability and cannot produce cured product with adequate mechanical strength and heat resistance.

Photo-initiators

The photo-initiator used as the component (C) is added to initiate the polymerization reaction between the ethylenically unsaturated bonds contained in the specific polyfunctional monomers (a) and the specific monofunctional monomers (b). There are no specific limitations to the photo-initiator inasmuch as the initiator compound is decomposed and produces a radical or a cation on irradiation with light which initiate polymerization of these monomers.

The following compounds are given as specific examples of such photo-initiators: acetophenone, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, benzyl methyl ketal, 3,3'-dimethyl-4-methoxybenzophenone, thioxanethone compounds, 2-methyl-1-4-(methylthio) phenyl-2-morpholino-propan-1-one, 2-benzyl-2-dimethyl-amino-1-(4-morpholinophenyl)-butan-1-one, triphenylamine, 2,4,6-trimethylbenzoyl diphenylphosphine oxides, bis(2,6-dimethoxybenzoyl)-2,4,4-trimethylpentyl phosphine oxides, benzyl methyl ketal, 1-hydroxycyclohexylphenyl ketone, 2-hydroxy-2-methyl-1-phenylpropan-l-one, fluorenone, fluorene, benzaldehyde, benzoin ethyl ether, benzoin propyl ether, Michler's ketone, 2-benzyl-2-dimethylamino-1-(4-morpholinophenyl)-butan-1-one, 3-methylacetophenone, 3,3,4,4-tetra(t-butylperoxy-carbonyl)benzophenone (BTTB), combinations of BTTB and xanthene, thioxanthene, cumarin, ketocumarin, or other coloring photosensitizer, 1-(4-dodecylphenyl)-2-hydroxy-2-methylpropan-1-one, 2-methyl-1-[4-(methylthio)phenyl]-2-morpholinopropan-1-one, benzoin, benzoin methyl ether, benzoin isobutyl ether, benzoin benzoic acids, and chloro-acetophenones such as 4-phenoxydichloroacetophenone. These compounds are used either individually or in combination of two or more.

Of these compounds, benzyl methyl ketal, 1-hydroxycyclohexylphenyl ketone, 2,4,6-trimethylbenzoyl diphenylphosphine oxides, and 2-benzyl-2-dimethylamino1-(4-morpholinophenyl)-butan-1-one are particularly preferred.

The component (C) is incorporated in the photo-curable resin composition of the present invention in the proportion of 0.01–10 parts by weight, and preferably 1–8 parts by weight, for 100 parts by weight of the total of the component (A) and component (B) which are the monomer components. If this proportion is less than 0.01 part by weight, the curing rate of the photo-curable resin composition may be decreased; if more than 10 parts by weight, on the other hand, there may be adverse effects exhibited on the curing characteristics of and the properties of the resulting three-dimensional objects, and on the handling of the photo-curable resin composition.

Inorganic Fillers

The inorganic fillers used as the component (D) may be particle inorganic fillers or fiber inorganic fillers having an average particle diameter or an average fiber length of 1–50 $\mu$m, and preferably 3–40 $\mu$m. If the average particle diameter or the average fiber length is less than 1 $\mu$m, the resulting composition has a large viscosity and exhibits a retarded curing rate. In addition, it is difficult to obtain a cured product with high dimensional precision from such a composition. When the average particle diameter or the average fiber length is more than 50 $\mu$m, on the other hand, it is difficult to obtain a cured product with a smooth surface from the resulting composition. The cured resin-based mold produced from such a composition cannot produce molded articles with a smooth surface.

Given as specific examples of such inorganic fillers are aluminium oxide, aluminium hydroxide, diatomaceous earth, glass beads, hollow glass beads, magnesium oxide, magnesium hydroxide, magnesium carbonate, silica particles, shirasu balloon, glass fiber, potassium titanate whisker, carbon whisker, sapphire whisker, beryllia whisker, boron carbide whisker, silicon carbide whisker, and silicon nitride whisker. Of these, glass beads, hollow glass beads, and potassium titanate whisker are desirable. These inorganic fillers may be used either individually or in combinations of two or more.

Moreover, the inorganic fillers of which the surface is treated with a silane coupling agent can also be used. Examples of the silane coupling agents used as the surface treatment agent for inorganic fillers include vinyl trichlorosilane, vinyl tris($\beta$-methoxyethoxy)-silane, vinyl triethoxysilane, vinyl trimethoxysilane, Y-(methacryloxypropyl)trimethoxysilane, $\beta$-(3,4-epoxycyclohexyl)ethyltrimethoxy silane, Y-glycydoxy propyltrimethoxy silane, Y-glycydoxypropylmethyldiethoxy silane, N-$\beta$-(aminoethyl)-Y-aminopropyltrimethoxysilane, N-$\beta$-(amino ethyl)-Y-aminopropylmethyldimethoxysilane, Y-aminopropyltriethoxysilane, N-phenyl-Y-aminopropyl-trimethoxysilane, Y-mercaptopropyltrimethoxysilane, and Y-chloropropyltrimethoxysilane.

Given as examples of commercially available products of the inorganic fillers are the products available under the trademarks of Glass Beads GB210, GB210A, GB210B, GB210C, GB045Z, GB045ZA, GB045ZB, GB045ZC, GB731, GB731A, GB731B, GB731C, GB731M, GB301S, EGB210, EGB210A, EGB210B, EGB210C, EGB045Z, EGB045ZA, EGB045ZB, EGB045ZC, MB-10, MB-20, EMB-10, EMB-20, HSC-070Q, HSC-024X, HSC-080S, HSC-070G, HSC-075L, HSC-110, HSC-110A, HSC-110B, HSC-110C (manufactured by Toshiba Balotini Co., Ltd.); Radiolite #100, Radiolite Fine Flow B, Radiolite Fine Flow A, Radiolite Sparkle Flow, Radiolite Special Flow, Radiolite #300, Radiolite #200, Radiolite Clearing Flow, Radiolite #500, Radiolite #600, Radiolite #2000, Radiolite #700, Radiolite #500S, Radiolite #800, Radiolite #900, Radiolite #800S, Radiolite #3000, Radiolite Ace, Radiolite Super Ace, Radiolite High-Ace, Radiolite PC-1, Radiolite Deluxe P-5, Radiolite Deluxe W-50, Radiolite Micro Fine Radiolite F, Radiolite SPF, Radiolite GC (manufactured by Showa Chemical Industry, Co., Ltd.); Higilite H-X, Higilite H-21, Higilite H-31, Higilite H-32, Higilite H-42, Higilite H-42M, Higilite H-43, Higilite H-32ST, Higilite H-42STV, Higilite H-42T, Higilite H-34, Higilite H-34HL, Higilite H-32I, Higilite H-42I, Higilite H-42S, Higilite H-210, Higilite H-310, Higilite H-320, Higilite H-141, Higilite H-241, Higilite H-341, Higilite H-320, Higilite H-320ST, Higilite HS-310, Higilite HS-320, Higilite HS-341, Alumina A-42-6, Alumina A-42-1, Alumina A-42-2, Alumina A-42-3, Alumina A-420, Alumina A-43-M, Alumina A-43-L, Alumina A-50-K, Alumina A-50-N, Alumina A-50-F, Alumina AL-45-H, Alumina AL-45-2, Alumina AL-45-1, Alumina AL-43-M, Alumina AL-43-L, Alumina AL-43PC, Alumina AL-150SG, Alumina AL-170, Alumina A-172, Alumina A-173, Alumina AS-10, Alumina AS-20, Alumina AS-30, Alumina AS-40, Alumina AS-50 (manufactured by Showa Denko Co., Ltd.); Starmague U, Starmague M, Starmague L, Starmague P, Starmague C, Starmague CX, High-Purity Magnesia HP-10, High-Purity Magnesia HP-10N, High-Purity Magnesia HP-30, Star Brand-200, Star Brand-10, Star Brand-10A, Star Brand magnesium carbonate Gold Star, Star Brand magnesium carbonate Two Stars, Star Brand magnesium carbonate One Star, Star Brand magnesium carbonate S, Star Brand magnesium carbonate for feed, Star Brand heavy magnesium carbonate, High-Purity magnesium carbonate GP-10, High-Purity magnesium carbonate 30, Star Brand light calcium carbonate for general used, Star Brand light calcium carbonate EC, Star Brand light calcium carbonate KFW-200 (manufactured by Konoshima Chemicals Industry Co., Ltd.); MKC silica GS50Z, MKC silica SS-15 (manufactured by Mitsubishi Chemical Co., Ltd.), Admafine SO-E3, Admafine SO-C3, Admafine AO-800, Admafine A0-809, Admafine AO-500, Admafine AO-509 (manufactured by Admatechs Co., Ltd.); XM-220 (manufactured by Mitsui Petrochemical Co., Ltd.); and Tismo D, Tismo L, Tophicar Y, Tophicar YN, Tophicar YB, Dendole WK-200, Dendole WK-200B, Dendole WK-300, Dendole BK-200, Dendole BK-300, Swanite, Bali- High B Super Dendole (manufactured by Otsuka Chemical Co., Ltd.). The proportion of the component (D) in the photo-curable resin composition of the present invention is 100–160 parts by volume, preferably 120–155 parts by volume, for 100 parts by volume of the total weight of the component (A), the component (B), and the component (C). Here, the volume of an inorganic filler is the value (w/d) obtained by dividing the weight (w) of the inorganic filler by the true specific gravity (d) of this organic filler.

When this proportion of the component (D) is less than 100 parts by volume, the storage stability of the resulting photo-curable resin composition is low, causing the inorganic filler to easily float or precipitate. In addition, it is difficult to obtain a three-dimensional object which possesses high hardness and heat resistance. On the other hand, when this proportion of the component (D) exceeds 160 parts by volume, the viscosity of the composition tends to be high and it becomes difficult to obtain a three-dimensional object with high dimensional accuracy.

Optional Components

The photo-curable resin composition of the present invention contains the above-mentioned components (A), (B), (C), and (D) as essential components. In addition to these essential components, various other components may be optionally incorporated into the resin composition of the present invention. Such other components include photosensitizers (polymerization promoters) of amine compounds such as triethanolamine, methyl diethanolamine, triethylamine, diethylamine; reactive diluents such as a vinyl ether, a vinyl sulfide, a vinyl urethane, or a vinyl urea; resinous additives such as epoxy resin, polyamide, polyamideimide, polyurethane, polybutadiene, polyethylene, chloroprene, polyether, polyester, styrene-butadiene-styrene block copolymer, petroleum resin, xylene resin, ketone resin, cellulose resin, fluorine-containing oligomer, silicon-containing oligomer, polysulfide oligomer; polymerization inhibitors such as phenothiazine or 2,6-di-t-butyl-4-methyl phenol; polymerization initiation adjuvants, leveling agents, wettability improvers, surfactants, plasticizers, UV absorbers, silane coupling agents, resin particles, pigments, dyes and the like. The amount of these optional components to be added may be suitably adjusted in the range where the curability of the composition is not adversely affected.

The photo-curable resin composition of the present invention can be manufactured by homogeneously blending the above-mentioned components (A) to (D) and the other optional components which are used as required. It is desirable for the photo-curable resin composition of the present invention to possess a viscosity in the range of 100–50,000 cps, and preferably 500–20,000 cps, at 25° C.

Manufacture of Three-Dimensional Objects

The photo-curable resin composition of the present invention prepared in this manner is suitable as a photo-curable material used in photo-fabrication processes. Specifically, a three-dimensional object with a desired shape formed by integrally laminated cured resin layers can be obtained by repeating the step of forming a cured layer from the photo-curable resin composition of the present invention by selective irradiation by visible light, ultraviolet light, or infrared light.

Illustrating the process for manufacturing such three-dimensional object more specifically, the photo-curable resin composition is supplied to a suitable supporting stage to form a thin layer (1) of the photo-curable resin composition, this thin layer (1) is selectively irradiated with light to produce a cured solid resin layer (1), the photo-curable resin composition is supplied over this cured resin layer (1) to form a second thin layer (2), and this thin layer (2) is selectively irradiated with light to produce a new cured resin layer (2). This step is repeated for a prescribed number of times, with or without changing the pattern subjected to light irradiation, to produce a three-dimensional object formed by a multiple number of cured resin layers (n) which are integrally laminated.

Various means may be used to selectively irradiate the photo-curable resin composition with light with no specific limitations. Such light irradiation means include, for example, (1) a means for irradiating the composition while scanning with a laser beam or a convergent light using a lens, mirror, or the like, and the like, (2) a means for irradiating the composition with a non-convergent light through a mask provided with a fixed pattern through which light is transmitted, and (3) a means for irradiating the composition via an optical conductive devices such as bundled optical fibers fixed patterns. In the means using a mask, a mask which electrooptically produces a mask image consisting of a light transmitting area and a non-light-transmitting area according to a prescribed pattern by the same theory as that of the liquid crystal display apparatus. Among these means of light irradiation, the means for selectively irradiating the composition with scanning laser light is preferred for molding a three-dimensional object possessing minute parts or requiring high dimensional accuracy.

The three-dimensional object molded in this manner is processed to removed unreacted photo-curable resin composition remaining on the surface and washed, as required. An organic solvent which is represented by an alcohol such as isopropyl alcohol or ethyl alcohol, an ester such as ethyl acetate, a ketone such as acetone or methyl ethyl ketone, or a low viscosity liquid thermosetting resin or photo-curable resin, can be used as the washing agent in this washing step.

When a three-dimensional object with an excellent smooth surface is to be manufactured, it is desirable that the product be subjected to a post-curing treatment, which may be a treatment with heat or light irradiation, after washing, depending on the types of curable resin used as the washing agent. This post-cure treatment is effective not only for curing the resin remaining uncured on the surface of the three-dimensional object, but also for curing the resin composition which remains uncured inside the three-dimensional object. Thus, the post-curing treatment is effective also in the case where the molded product is washed with an organic solvent.

In addition, it is desirable to provide a surface treatment using a heat curable or photo-curable hard coating agent to improve the hardness and heat resistance of the surface of the three-dimensional object obtained after the washing treatment. An organic coating agent of acrylic resin, epoxy system resin, or silicon-containing resin, or various kinds of inorganic coating agents can be used as the hard coating agent. It is possible to use two or more hard coating agents.

A three-dimensional object of the present invention obtained by the process mentioned above possesses high molding dimensional accuracy and exhibits a high heat distortion temperature of 100° C. or higher. The cured product has sufficient mechanical strength and heat resistance for this product to be employed us a mold which is subjected to high temperature and high pressure conditions. Accordingly, the three-dimensional object is particularly suitable as a resin-based mold which is used for various molding methods, such as an injection molding method, press molding method, vacuum molding method, high-pressure molding method, and foaming molding method.

EXAMPLES

The present invention will be explained in more detail by way of examples, which are not intended to be limiting of the present invention.

EXAMPLE 1–4

The component (A), component (B), component(C), and optional components (additives) were fed into a vessel equipped with a stirrer in the proportion shown in Table 1. The mixture was stirred for two hours at 50° C. to obtain a homogeneous resin liquid. Next, this resin liquid was mixed with the component (D) shown in Table 1 and transferred into a vessel equipped with a high speed stirrer. The mixture was stirred at 3000 rpm at room temperature for 10 minutes to obtain a photo-curable resin composition of the present invention (Composition (1)-Composition (4)) containing the component (D) homogeneously dispersed therein. All compositions of the present invention prepared in this manner were homogeneous opaque and viscous liquids. The viscosity at 25° C. of the compositions (1)–(4) measured by the B-type viscometer are also shown in Table 1.

Comparative Example 1–3

A vessel equipped with a stirrer was charged with the component (A), component (B), component(C), and optional components (additives) in the proportion shown in Table 1. The mixture was stirred for two hours at 50° C. to obtain a homogeneous resin liquid. Next, this resin liquid was mixed with the component (D) shown in Table 1 and transferred into a vessel equipped with a high speed stirrer. The mixture was stirred at 3000 rpm at room temperature for 10 minutes to obtain a photo-curable resin composition (Composition (5)-Composition (7)) containing the component (D) homogeneously dispersed therein. The Composition (5) contained the component (D)in a proportion less than that required in the present invention; the Composition (6) contained the component (B) in a proportion less than that required in the present invention; and The Composition (7) contained the component (A) in a proportion less than that required in the present invention. All Compositions (5)–(7) were homogeneous opaque and viscous liquids. The viscosity at 25° C. of the Compositions (5)–(7) measured by the B-type viscometer are also shown in Table 1.

Evaluation of Photo-Curable Resin Compositions

The photo-curable resin compositions prepared in Examples 1–4 and Comparative Examples 1–3 were evaluated by measuring the bending strength and heat distortion temperature of the cured products according to the following methods. The results are shown in Table 1.

Preparation of Test Specimens

A mold for producing test specimens was prepared by fixing a PET film to a glass plate and applying a silicone rubber plate with a thickness of 4 mm and having a 120 mm×11 mm rectangular through-hole over the PET film. Then, (1) a photo-curable resin composition in an amount sufficient to provide a film with a thickness of about 1 mm was poured into the mold, and (2) ultraviolet radiation at a dose of 0.5 J/cm2 was implemented using a conveyer curing apparatus equipped with a metal halide lamp to cure the composition. The procedure consisting of (1) and (2) was repeated four times to obtain a cured product in the shape of a rod with a thickness of 4 mm. This rod-shaped cured product was post-cured by applying ultraviolet light over the entire surface thereof at a radiation dose of 10 J/cm2. After the post-cure, the product was allowed to stand under conditions of 23° C. and 50% RH for 24 hours to obtain a test specimen for the measurement of the heat distortion temperature.

Measurement of the Bending Strength

The bending strength of the test specimens was measured at 23° C. and 50% RH at a bending rate of 50 mm/min and a bench mark distance of 40 mm.

Measurement of the Heat Distortion Temperature

The heat distortion temperature of the test specimens was measured according to JIS K7207 A.

Preparation of Resin-Based Molds

Cavity and core were prepared from the Compositions (1)–(4) obtained in the Examples 1–4 and the Compositions (5)–(7) obtained in the Comparative Examples 1–3 using an photo-fabrication apparatus Solid Creator JSC-2000 (manufactured by Sony Corporation), shown in FIG. 1, which employs an argon ion laser emitter (wavelength: 351 nm, 365 nm) as the light source for irradiation under the following conditions.

(1) Laser beam intensity on the liquid surface: 40 mW (2) Scanning rate: 100 cm/second (3) Thickness of molded cured resin layer: 0.2 mm (4) Number of laminations for cavity: 306

(5) Number of laminations for core: 220

FIG. 1(I) is a plane view and FIG. 1(II) is a side-view of the cavity. In FIG. 1(I), 1 denotes a pin form, 2 a rib, 3 a pin form, 4 a nail, 5 a securing screw hole, and 6 a pin form.

Post Treatment

After removing the resin composition adhering to the surface of the molded cavity and core, the products were subjected to post-curing by irradiation with ultraviolet light at a dose of 20 mW/cm2 for 30 minutes and annealed for one hour at 150° C.

Evaluation of Resin-Based Molds

ABS resin S996-JB Gray (manufactured by Japan Synthetic Rubber Co., Ltd.) was molded by injection using the resin-based cavity and core thus prepared under a clamping force of 10 tons, a cylinder temperature of 230° C., a mold temperature of 40° C., an injection rate of 20 mm/second, and a holding pressure (10 %) of 175 kg/cm2. The molding precision of the injection-molded products and the repetition durability of the resin-based molds were evaluated according to the following standard.

Molding Precision:

Good: When the dimensional precision was less than 0.5% of the target molded article.

Bad: When the dimensional precision was greater than 0.5% of the target molded article.

Repetition durability: The number of times which the resin-based mold could mold the articles without being broken, when continuously used for injection molding. The results of the evaluation are shown in Table 1.

bending strength because of inclusion of too small an amount of the component (D). In addition, the resin-based mold prepared from this composition produced molded articles with inferior dimensional accuracy and exhibited poor durability in repeated uses.

The Compositions (6) and (7) prepared respectively in the Comparative Examples 2 and 3 also produced cured products with a low bending strength. The resin-based mold prepared from these compositions produced molded articles

TABLE 1

| | Example | | | | Comparative Example | | |
|---|---|---|---|---|---|---|---|
| | 1 | 2 | 3 | 4 | 1 | 2 | 3 |
| Composition | 1 | 2 | 3 | 4 | 5 | 6 | 7 |
| Component A | | | | | | | |
| Tricyclodecanediyldimethylene diacrylate *(a) | 50 | 50 | 25 | | 25 | 50 | 50 | 20 |
| Bisphenol A diglycidyl ether diacrylate *(b) | | | 25 | | | | |
| Tris(2-hydroxyethyl)isocyanurate triacrylate *(c) | | | | 25 | | | |
| Component B | | | | | | | |
| N-vinylpyrrolidone *(e) | 25 | | 25 | 25 | 25 | 25 | 25 |
| N-vinyl caprolactam *(f) | | 25 | | | | | |
| Acryloyl morpholine *(g) | | 25 | | | | | |
| Tricyclo[5.2.1.0$^{2,6}$]decanyl acrylate *(h) | 25 | | 25 | 25 | 25 | | 25 |
| Component (C) | | | | | | | |
| 2-Benzyl-2-dimethylamino-1-(4-morpholinophenyl)-butan-1-one *(j) | 0.25 | 0.25 | 0.25 | | 0.25 | 0.25 | 0.25 |
| Benzyl dimethyl ketal *(k) | | | | 3 | | | |
| Optional Component | | | | | | | |
| Polyethylene glycol 200 diacrylate *(d) | | | | | | | 30 |
| Phenoxyethyl acrylate *(i) | | | | | | 25 | |
| Component (D) | | | | | | | |
| Glass beads *(l) | 300 | 300 | 300 | 300 | 200 | 300 | 300 |
| The amount of glass beads (V/100 V of resin liq.) | 120 | 120 | 120 | 117 | 80 | 120 | 120 |
| Test Results | | | | | | | |
| Viscosity of the composition (cPs: 25° C.) | 1800 | 3000 | 8000 | 15000 | 600 | 2000 | 1200 |
| Bending strength (kg/mm$^2$) | 11 | 11 | 10 | 10 | 6 | 5 | 5 |
| Heat distortion temp. of injection product (°C.) | 175 | 150 | 120 | 110 | 120 | 70 | 80 |
| Molding precision | Good | Good | Good | Good | Bad | Bad | Bad |
| Repetition durability (times) | 200 | 188 | 100 | 110 | 10 | 0 | 5 |

Notes for Table 1:
(a) Yupimer UV SA1002 (manufactured by Mitsubishi Chemical Co., Ltd.)
(b) VR-77 (manufactured by Showa Highpolymer Co., Ltd.)
(c) Aronix M-315 (manufactured by Toagosei Chemical Industries, Co., Ltd.)
(d) SR259 (manufactured by Satomer Co., Ltd.)
(e) Vinyl pyrrolidone (manufactured by BASF)
(f) Vinyl caprolactam (manufactured by BASF)
(g) ACMO (manufactured by Kojin Co., Ltd.)
(h) FA-513A (manufactured by Hitachi Chemical Co., Ltd.)
(i) Viscoat 192 (manufactured by Osaka Organic Chemical Industry, Ltd.)
(j) Irgacure 369 (manufactured by Ciba Geigy)
(k) Irgacure 651 (manufactured by Ciba Geigy)
(l) GBO45ZC (manufactured by Toshiba Balotini Co., Ltd.)

As is clear from Table 1, all Compositions (1)–(4) prepared in Examples 1–4 possessed a suitable viscosity as the photo-curable material used for photo-fabricating methods. The cured products prepared from these compositions had high bending strength and a high heat distortion temperature of 100° C. or higher. The mechanical characteristics and heat resistance were sufficiently high for these cured products to be used as resin-based molds. In addition, the resin-based molds produced using the Compositions (1)–(4) as the photo-curable materials could produce molded articles with a high dimensional precision and could be used repeatedly for a number of times.

In contrast, the Composition (5) prepared in the Comparative Example 1 produced cured products with a low with inferior dimensional accuracy and exhibited poor durability in repeated uses.

The photo-curable resin composition of the present invention can produce cured products exhibiting excellent mechanical strength and heat resistance. The composition can therefore be suitably used as a photo-curable material for photo-fabrication methods. In addition, the process of the present invention can easily manufacture a resin-based mold which can produce molded articles with excellent molding dimensional precision and which can be repeatedly used for more than 100 times without being deformed or broken.

This application claims priority based on Japanese patent application No. 137028/96 filed on May 30, 1996, the complete disclosure of which is incorporated herein by reference.

What is claimed is:

1. A photo-curable resin composition for photo-fabrication comprising; as premixture ingredients:

a monomer component comprising: 30 to 70 wt. % of at least one polyfunctional unsaturated monomer having at least one cyclic structure, and 70 to 30 wt. % of at least one monofunctional unsaturated monomer having at least one cyclic structure, which monofunctional unsaturated monomer when tested as a homopolymer has a glass transition temperature of at least 70° C.;

at least one photo-initiator; and at least one inorganic filler having an average particle diameter or an average fiber length in a range of from about 1 to about 50 µm;

wherein a volumetric ratio of said inorganic filler to a combination of said monomer component and said photo-initiator is in a range of from about 1:1 to about 1.6:1, and wherein a heat distortion temperature of a cured resin formed by photo-curing said photo-curable resin composition is at least 100° C.

2. A photo-curable resin composition according to claim 1, wherein said polyfunctional unsaturated monomer is a polyfunctional (meth)acrylate.

3. A photo-curable resin composition according to claim 1, wherein said polyfunctional unsaturated monomer is at least one monomer selected from the group consisting of tricyclodecanediyldimethylene di(meth)acrylate, tris(2-hydroxyethyl) isocyanurate tri(meth)acrylate, bisphenol A diglycidyl ether di(meth)acrylate, and bisphenol F diglycidyl ether di(meth)acrylate.

4. A photo-curable resin composition according to claim 1, wherein said polyfunctional unsaturated monomer comprises from about 35 to 65 wt. % of said monomer component.

5. A photo-curable resin composition according to claim 1, wherein a homopolymer of said monofunctional unsaturated monomer has a glass transition temperature of at least 90° C.

6. A photo-curable resin composition according to claim 1, wherein said at least one monofunctional unsaturated monomer is selected from the group consisting of (meth)acryloyl morpholine, isobornyl (meth)acrylate, N-vinyl caprolactam, N-vinyl pyrrolidone, tricyclo[$5.2.1.0^{2,6}$] decanyl (meth)acrylate, and dicyclopentenyl (meth)acrylate.

7. A photo-curable resin composition according to claim 1, wherein said monofunctional unsaturated monomer comprises from about 35 to 65 wt. % of said monomer component.

8. A photo-curable resin composition according to claim 1, wherein said at least one photo-initiator is selected from the group consisting of benzyl methyl ketal, 1-hydroxycyclohexylphenyl ketone, 2,4,6-trimethylbenzoyl diphenylphosphine oxides, and 2-benzyl-2-dimethylamino-1-(4-morpholinophenyl)-butan-1-one.

9. A photo-curable resin composition according to claim 1, wherein said photo-initiator is present in a range of from about 0.01 to about 10 parts by weight to 100 parts by weight of said monomer component.

10. A photo-curable resin composition according to claim 1, wherein said photo-initiator is present in a range of from about 1 to about 8 parts by weight to 100 parts by weight of said monomer component.

11. A photo-curable resin composition according to claim 1, wherein said inorganic filler has an average particle diameter or an average fiber length in a range of from about 3 to about 40 µm.

12. A photo-curable resin composition according to claim 1, wherein said at least one inorganic filler is selected from the group consisting of glass beads, hollow glass beads, and potassium titanate whisker.

13. A photo-curable resin composition according to claim 1, wherein said inorganic filler is treated with at least one silane coupling agent.

14. A photo-curable resin composition according to claim 1, wherein said volumetric ratio of said inorganic filler to said combination of said monomer component and said photo-initiator is in a range of from about 1.2:1 to about 1.55:1.

15. A photo-curable resin composition according to claim 1, wherein said composition further comprises photosensitizers, reactive diluents, resinous additives, polymerization inhibitors, polymerization initiation adjuvants, leveling agents, wettability improvers, surfactants, plasticizers, UV absorbers, silane coupling agents, resin particles, pigments, and dyes.

16. A photo-curable resin composition according to claim 1, wherein said photo-curable resin composition has a viscosity in a range of from about 100 to about 50,000 cps at 25° C.

17. A photo-curable resin composition according to claim 1, wherein a bending strength of a cured resin formed by photo-curing said photo-curable resin composition is greater than about 9 kg/mm$^2$.

18. A process for the preparation of a resin-based mold comprising the steps of:

forming a first layer of a photo-curable resin composition according to claim 1;

curing select portions of said first layer by radiation to form a first cured layer;

applying a second layer of a photo-curable resin composition according to claim 1, on top of said first cured layer;

curing select portions of said second layer by radiation to form a second cured layer, and repeating said applying and curing steps a plurality of times to produce a resin-based mold comprising a plurality of integrally laminated layers of cured resin.

19. A process for the preparation of a resin-based mold according to claim 18, further comprising a step of washing said resin-based mold with at least one washing agent.

20. A process for the preparation of a resin-based mold according to claim 19, wherein said washing agent is at least one agent selected from the group consisting of alcohol, ester, ketone, a low viscosity liquid thermosetting resin, and a low viscosity photo-curable resin.

21. A process for the preparation of a resin-based mold according to claim 18, further comprising a step of irradiating said resin-based mold with heat or light radiation.

22. A process for the preparation of a resin-based mold according to claim 18, further comprising a step of treating a surface of said resin-based mold with at least one heat or photo-curable hard coating agent.

23. A process for the preparation of a resin-based mold according to claim 22, wherein said hard coating agent is at least one agent selected from the group consisting of acrylic resin, epoxy system resin, silicon-containing resin, and inorganic coating agents.

* * * * *